April 9, 1968 L. J. SCHWARTZKOPF ET AL 3,377,429

AUDIO READOUT OF REMOTELY LOCATED METER

Filed July 20, 1960 2 Sheets-Sheet 1

INVENTORS
LEWIS J. SCHWARTZKOPF
JOHN S. LAVENDER JR.
BY McGrew & Edwards
ATTORNEYS

AUDIO READOUT OF REMOTELY LOCATED METER

Filed July 20, 1960 2 Sheets-Sheet 2

INVENTORS:
LEWIS J. SCHWARTZKOPF
JOHN S. LAVENDER JR.
BY McGrew & Edwards
ATTORNEYS

United States Patent Office 3,377,429

Patented Apr. 9, 1968

3,377,429

AUDIO READOUT OF REMOTELY LOCATED METER

Lewis J. Schwartzkopf and John S. Lavender, Jr., Findlay, Ohio, assignors to Marathon Oil Company, a corporation of Ohio Filed July 20, 1960, Ser. No. 44,124
4 Claims. (Cl. 179—6)

This invention relates to telemetering equipment and particularly to an improved apparatus for accumulating information and automatically transmitting a report to a central station or other remote point.

Many operations in industry require that information be secured from remote points with speed and accuracy. Often it is desirable to secure such information without requiring that an attendant be available at the remote point, and various types of telemetering equipment have been provided for effecting automatic transmission of data under such circumstances.

It is an object of the present invention to provide an improved apparatus for effecting automatic transmission of information from metering instruments and the like located at remote points.

It is another object of this invention to provide an improved telemetering apparatus for securing information from remote points by voice transmission and which is rugged and reliable in operation.

Briefly, in carrying out the objects of this invention in one embodiment thereof a telemetering equipment is provided for installation at a flowmeter or similar instrument and is controlled from a remote point by operation of telephone equipment or the like; for example, the telephone number of the remote station may be dialed whereupon the equipment at the station operates to transmit over the telephone by recorded voice the identification and data required.

The equipment comprises a digitalized counter of the type having a plurality of digit elements, such as number wheels, each associated with a series of normally open switches one for each digit, a record holder or drum on which are recordings of the nine digits and zero and identification, and a scanning device for connecting each element of the counter in turn to effect reproduction of whatever one of the recordings corresponds to the digit indicated by the element. The scanning device is arranged to maintain connection of the selected pickup in the transmitting circuit for a substantial period of rotation of the record drum and assures transmission of the recording thereon during a single revolution of the drum. All the information is transmitted in one revolution of the scanning device, the record drum being rotated a sufficient number of times to transmit information corresponding to all the indicated digits; in addition, a final zero is transmitted as the last digit, the units column being transmitted as zero so that the reading is given in tens as the minimum unit. This makes possible, for example, the use of a five-digit counter to indicate six digit numbers.

An electric motor is employed and the counter is operated from the same supply. A stand-by battery is provided together with a control for connecting the counter to the battery upon failure of the supply current. Thus the accumulating operation of the counter continues although failure of the normal current supply may prevent transmission of the information at the particular time.

The features of novelty which characterize the invention are pointed out with particularly in the appended claims. The invention itself, however, both as to its organization and method of operation may better be understood upon reference to the accompanying drawings, in which:

Figures 1, 2:
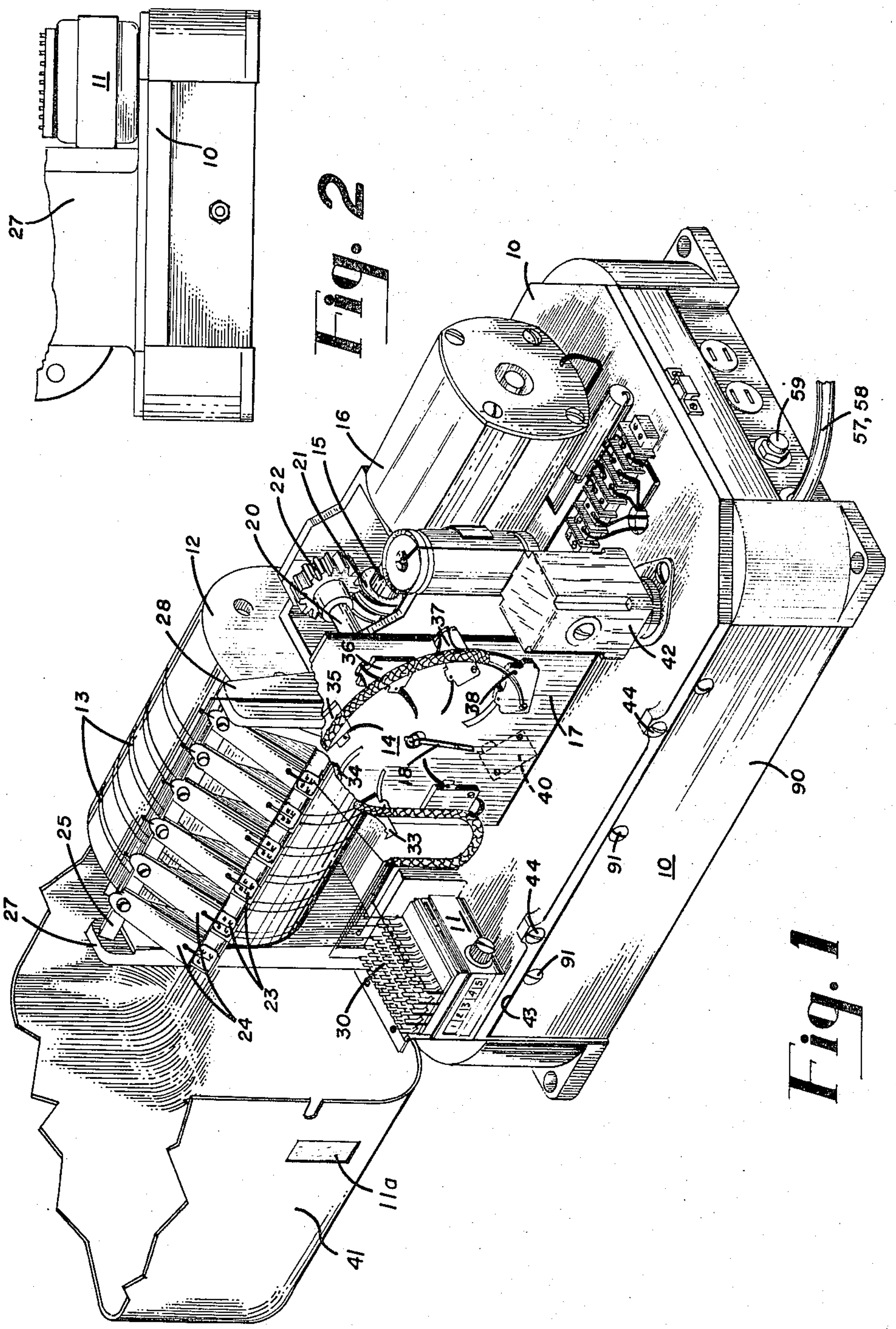
FIG. 1 is a perspective view of the automatic transmitting equipment embodying the invention.
FIG. 2 is an end elevation view of a portion of the apparatus of FIG. 1.

Referring now to the drawings, the telemetering equipment illustrated in FIG. 1 comprises a four-legged base 10 having mounted on the top thereof a digitalized counter 11 illustrated as a five-digit counter, a rotary drum 12 having around its circumference at spaced intervals six magnetized tapes 13 bearing voice transcriptions of zero and the digits from one to nine together with station identification. The drum is connected through a shaft 15 to be driven by a motor 16, and a rotary scanning device 14 is mounted on an upright panel 17 and includes a rotary arm 18 mounted on a shaft 20 driven from the shaft 15 through a worm 21 and worm gear 22.

In order to reproduce the voice recordings on the tapes 13 a plurality of pickup heads or electromagnetic transducers 23 are mounted in line adjacent the record tapes 13. The heads 23 are carried on arms 24 removably attached to a crossbar 25 which is mounted between spaced upright rigid posts 27 and 28 secured to the base 10. The counter 11 is provided with an electric terminal block 30 providing five rows of eleven contacts each, corresponding to the five-digit elements of the counter; the eleven contacts for each row include connections for each of the nine digits and zero together with a common connection which is at the opposite side of all of the switches. The operation of the counter digit elements is such that each element closes switch terminals between the common terminal and its respective one of the ten remaining terminals. Counters of this type are available on the market and the internal details of construction are not essential to an understanding of the present invention. The counter illustrated is a digitalized counter manufactured and sold by Veeder-Root, Inc. The terminals in each of the five digit element rows which represent the same digits are connected together and are connected to the respective ones of the pickup heads 23. The heads are illustrated comprise transducers mounted in pairs to cooperate with dual sound tracks on the tapes 13.

The scanner 14 in the illustrated arrangement is provided with seven normally open switches of the so-called microswitch type indicated in order by the numerals 32 to 38, inclusive. These switches are mounted in a circle on the front face of the panel 17 and are provided with elongated flexible actuating fingers positioned in the path of the arm 18. The arm rotates in a clockwise direction as viewed in FIG. 1 and engages each flexible arm in turn, pressing it outwardly and closing the corresponding switch. The engagement of the arm and the flexible finger continues until the arm passes the end of the finger when the switch is restored to its open position. The timing of the closed period of each switch is arranged so that the portion of the corresponding tape 13 bearing the recorded information will pass under the pickup head and transmit the complete information during the period that the switch is closed.

Figures 3, 4:
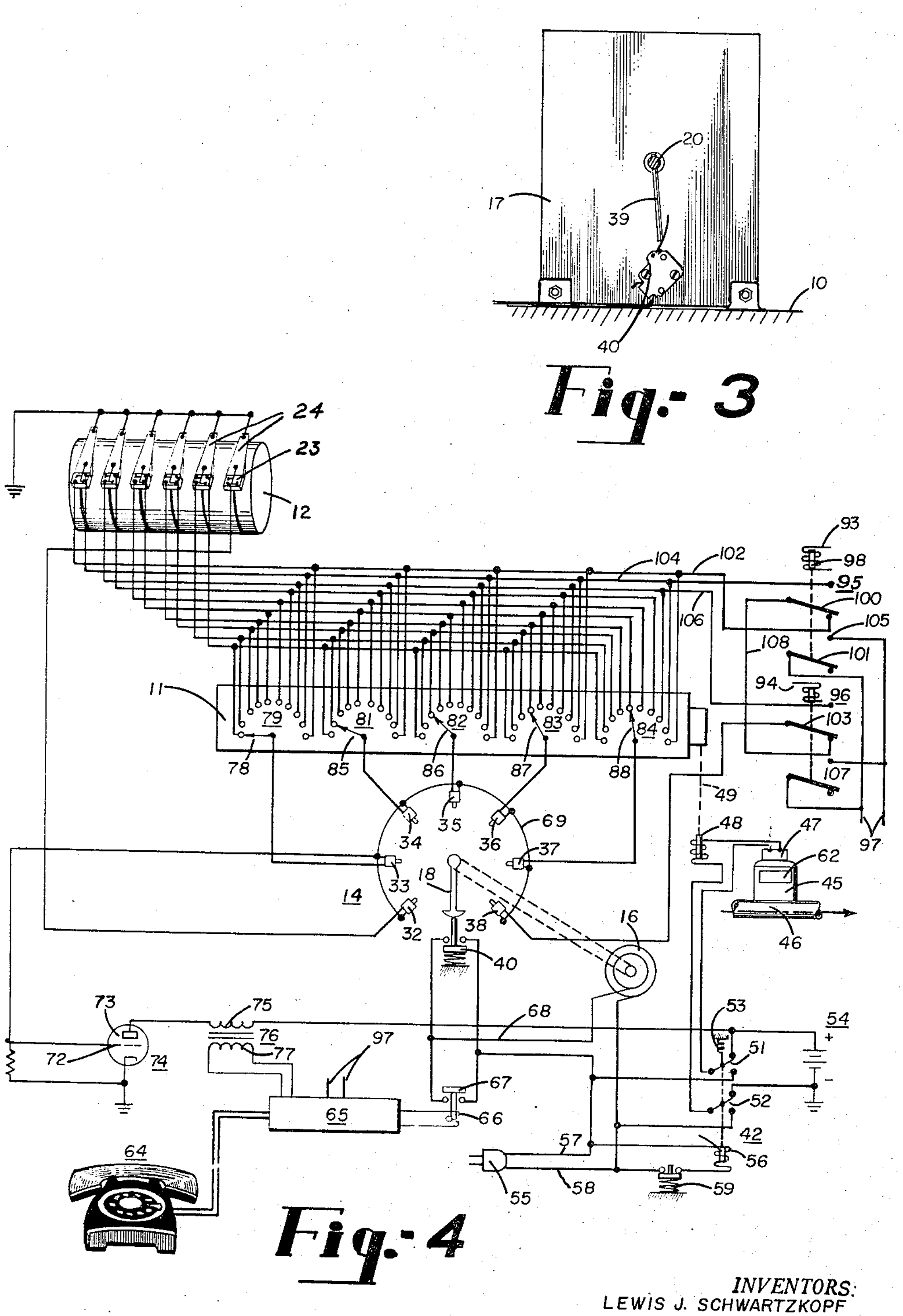
FIG. 3 is a rear elevation view of the scanning device of the apparatus of FIG. 1.
FIG. 4 is a circuit diagram of the apparatus showing the pickup heads and the scanner connected in the electrical circuit of the system.

An eighth switch 40 of the same general type as the switches 32 through 38 but which is normally closed is mounted on the back of the panel 17 between the positions of the switches 32 and 38 so that it may be actuated by an arm 39 mounted on the shaft 20 of the arm 18 on the back of the panel as shown in FIG. 3.

The driving ratio of the worm 21 and the worm gear 22 is selected so that the arm 18 will rotate through one complete cycle or revolution while the drum 12 revolves eight times, this being sufficient to move the scanning arm 39 from its normal stop position in engagement with the flexible arm of the limit switch 40 through one revolution back to its motor stopping position. During this single revolution of the arm 39 the arm 18 moves into engagement with all of the switches 32 through 38 in turn before the limit switch 40 stops the motor.

For some applications it may be desirable to operate the scanning device 14 through a plurality of revolutions before stopping the motor 16, and in such case the arm 39 is driven through a separate gearing (not shown) so that it is rotated once while the arm 18 is rotated a plurality of times. One application in which the additional transmission of the information is desirable is that in which it is necessary to make a long-distance telephone call to the remote location of the metering device; the additional transmissions provide assurance that the correct digits will be recorded by the listener without requiring a second long-distance call for checking purposes.

Switches 33 through 37 are connected so that when they are closed they connect corresponding ones of the digit elements of the counter 11 to the selected ones of the pickup heads 23. The switch 38 is connected so that upon closing it connects the pickup head for the sound track on which zero is recorded. It will thus be seen that the five-digit counter 11 together with the operation of the switch 38 makes it possible to transmit information in six digits, the last digit being zero in all cases, this being an acceptable approximation for many uses.

In addition to the above described components a relay 42 is mounted on the base 10 and is connected in a manner to be described so that in the event of failure of the electric current supply which drives the motor 16 the electric actuation of the counter 11 will be continued by the connection of the counter to a stand-by supply such as a battery.

All of the equipment on the base 10 is arranged to be enclosed by a cover 41 shown in its open position and which rests on a shoulder 43 extending about the top of the base 10 and may be secured in position by screws 44 provided for this purpose. The cover is preferably provided with a window **11*a* through which the counter 11** may be read.

The arrangement of the electrical circuits and the operation of the apparatus will be better understood on reference to FIG. 4 which illustrates the pickup head assembly and the scanning device together with a diagrammatic illustration of other components and the circuit connections. In this figure the apparatus is shown connected to be used for transmitting the indicated reading of a flowmeter 45 connected to measure the flow in a fluid carrying conduit such as an oil pipeline 46. The flowmeter 45 includes an electric signal device for transmitting pulses through a circuit including a solenoid 48 connected through a mechanical link indicated by the dotted line 49 to actuate the counter 11.

The circuit of the signal device 47 and solenoid 48 is connected to alternative sources of electric current through blades 51 and 52 of relay 42. Relay 42 is biased to its upper position as illustrated by a spring 53, in which position the blades 51 and 52 engage their upper contacts connected to the terminals of a battery 54. When electric current is supplied to the apparatus by inserting a plug 55 into a suitable supply, a coil 56 of the relay 42 is energized, it being connected to lines 57 and 58 of the supply circuit through a normally closed testing switch 59.

Energization of the coil 56 draws an armature 61 of the relay downwardly and moves the blades 51 and 52 to their lower positions thereby connecting them, respectively, to the lines 57 and 58 of the electric current supply so that the flowmeter and counter are energized from the normal current supply.

During the operation of the apparatus the counter will be actuated whenever liquid is flowing in the conduit 46 through operation of the flowmeter 45 and periodic energization of the solenoid 48, it being understood that the electrical control 47 of the flowmeter will be arranged in the illustrated embodiment to energize the coil 48 once for each ten units indicated by the flowmeter. For example, when the flowmeter is measuring barrels of oil the control will energize the coil 48 once for every ten barrels of oil indicated by the flowmeter. The exact reading of the flowmeter is available at the indicating panel 62 of the motor. However, for purposes of the illustration it is assumed that remote readings within ten barrels are sufficient. The digits of the counter 11 will thus advance whenever ten units of liquid have flowed through the pipe 46 at the flowmeter, and the connections made by the switches of the digit elements will be changed progressively in accordance with the change in flowmeter reading.

When it is desired to learn the reading of the remote counter a telephone unit 64 is employed, the number of the remote station being dialed whereupon the telephone unit at the station, and indicated at 65, is operated to energize a coil 66 and close a switch 67 which is in parallel with the open switch 40. Closing of the switch 67 completes a circuit for the motor 16 which may be traced from the line 57 through the switch 67 and a line 68 to the motor 16 and back to the line 58. The motor is thus energized and the arms 18 and 39 and the drums 12 are rotated. For purposes of illustration, in FIG. 4 the arm 18 has been shown as actuating the switch 40 as well as the other switches 32 through 38. As soon as the switch 40 as been closed it will maintain the circuit of the motor 16 regardless of the condition of the switch 66, which is released by the apparatus 65 a short interval after energization of the coil 66, this interval being sufficient, however, to afford movement of the arm 39 and return of the switch 40 to its closed position.

The motor 16 now rotates the arm 18 so that it moves in order over the switches 32 through 38 and then returns the arm 39 to its stop position to open the switch 40 and stop the motor. The switch 32 when closed connects a circuit from a ring conductor 69 through the switch to one of the pickup heads 23 at the right end of the drum 12 as viewed in FIG. 4 so that a circuit is completed through the pickup head to the control electrode or grid 72 of an electron tube 73 of a pre-amplifier 74. The current generated by the pickup and amplified is supplied to a primary coil 75 of an audio transformer 76, the secondary of which, indicated at 77, is connected to the telephone circuit. The recorded voice on the identification tape is thus supplied to the telephone and identifies the station. The amplifier 74 has been illustrated as connected to the battery 54 to provide its anode voltage. The arm 18 then moves on to engage the finger of the switch 33, the drum 12 having moved through one revolution.

The closing of the switch 33 provides a circuit from the ring 69 and a digit selector indicated as a rotary arm 78 of the first digit element indicated as 79. This digit element has ten contacts, as indicated heretofore, representing the nine digits and zero and these are connected to the corresponding pickup heads so that the closing of the switch 33 will provide a connection to the pickup head selected by the position of the arm 78. The voice recorded on the selected tape is then impressed on the grid of the amplifier 74 and transmitted to the telephone 64. The closing of the succesive switches 34, 35, 36 and 37 effects a similar connection to the other digit elements of the counter designated 81, 82, 83 and 84 having rotary arms 85, 86, 87 and 88, respectively. The connection of each of these digit elements or switch assemblies in order results in the transmission of the full series of five digits a selected by the arm positions. The final digit of the six-digit number to be transmitted is zero and the connection of the zero tape for transmission is effected by closing of the switch 38, after which the arm 39 again engages the operating element of the switch 40 and opens the switch to stop the motor.

In the event that it is desired to arrange the apparatus to repeat this series of digits, a specific ratio gearing (not shown) may be provided so that the arm 18 rotates a plurality of times while the arm 39 rotates once thereby transmitting the counter reading a plurality of times before stopping the motor.

In the event that the normal electric current supply should fail, the relay 42 operates as described before, raising the arms 51 and 52 and connecting the counter actuating coil 48 across the battery 54. It is desirable to test the operation of this relay and the counter when connected to the battery, and it is for this purpose that the switch 59 is provided in the circuit of the coil 56 of the relay 42. The switch 59 is a normally closed push button switch and, when opened, de-energizes the coil 56 whereupon the relay armature is lifted by the spring 53 to close the blades 51 and 52 in their upper position and connect the battery to the counter. When this connection has been completed the operation of the counter when supplied by the battery may be checked.

The battery 54, call switch 65 and amplifier 74 are preferably mounted below the base 10 within a removable pan or enclosure 90 which is secured to the base by screws 91 and fits between the four legs of the base. The pan 90 together with the cover for the equipment as described above provides a complete enclosure for the unit and minimizes service difficulties which might arise due to the collection of dust or other matter.

For some applications of this system it is desirable to provide alarms or safety controls for indicating malfunctions of parts of the system, and an arrangement for this purpose is illustrated at the right-hand end of the selector switch assembly of FIG. 4. One or more alarm devices may be desirable, and by way of example two such devices have been illustrated. These may, for example, be actuated by excess temperature or by the failure of a component of the system to operate. The sensing portion of the alarm systems have not been shown as they are not essential to an understanding of the device, the alarm systems being so arranged as to energize solenoids or relays 93 and 94 to actuate their switch assemblies 95 and 96, respectively. These switch assemblies are connected to modify the operation of the zero transmitting circuit and to actuate a signal system such as the ringing circuit of the telephone system connected to a pair of leads 97 of the apparatus 65.

When the alarm system operates to energize the coil 93, an armature 98 is raised to move switch blades 100 and 101 to their upper positions. This opens the circuit of the top or zero lead indicated at 102 and instead connects the switch 38 through an upper blade 103 of the relay 96 to the circuit for the digit nine indicated at 104. At the same time, the lower blade 101 makes contact with an upper contact 105 and closes the ringing circuit so that, when the remote telephone 64 is answered and the apparatus operated to transmit the digital information, the final digit will be nine instead of zero, the digit nine under this condition designating the type of fault or failure detected by the alarm system.

When its alarm circuit detects a malfunction to energize the coil 94, the relay 96 upon operation takes precedence over the relay 95 and, upon movement of the blade 103 to its upper position, connects the switch 38 to the digit eight lead indicated at 106 and at the same time raises a lower blade 107 to energize the alarm circuit by connecting the leads 97. The movement of the blade 103 to its upper position disconnects a lead 108 which in the drop-out positions of the two relays provides the connection between the zero lead 102 and the switch 38. When disconnected in this manner the operation of the relay 95 has no effect upon the alarm system. Thus the fault detected and resulting in energization of the coil 94 will be transmitted by the telephone whether or not a simultaneous fault has been detected by the alarm connected to the coil 93.

The alarm system comprising suitable detectors and relays such as relays 95 and 96 operates to utilize the normal circuitry of the system to provide the emergency information transmission which is desirable in the event of malfunction of the system and operates effectively without modification of the primary circuits of the apparatus.

While the invention has been described in connection with a telemetering system for use in the remote reading of flowmeter totals, various modifications and other arrangements will occur to those skilled in the art. Therefore, it is not desired that the invention be limited to the specific arrangement illustrated and described and it is intended by the appended claims to cover all modifications which fall within the spirit and scope of the invention.

We claim:

1. A transmitting apparatus for telemetering systems and the like comprising a counter of the digital accumulator type having a plurality of digit indicating elements and a row of normally open switches for each element each switch representing a digit of the element and being closed when its respective digit is indicated by the element whereby one switch of each element is closed depending on the position of the counter, a rotatable record holder having voice recordings of the nine digits and zero arranged in spaced positions, a motor for rotating said record holder, pickup heads one adjacent each recording for reproducing said voice recordings, means actuated by a predetermined signal for energizing said motor to rotate said record holder, scanning means connected to be actuated by said motor for connecting the closed switch of each of said elements in order and at predetermined substantially equal intervals to their respective heads representing the respective digit corresponding to each closed switch, said scanning means comprising a rotary switch unit for connecting said pickup heads selectively one at a time to said output circuit, said unit comprising a rotatable arm and a plurality of normally open switches positioned for successive engagement and operation by said arm during its rotation, each of said switches having an elongated flexible actuating member extending into the path of said arm and arranged to remain in operating engagement with said arm a time sufficient to afford reproduction of the recording on the corresponding head, and means for transmitting the voice signals from the selected digit recording to a telephone circuit.

2. A transmitting apparatus for telemetering systems and the like comprising a counter of the digital accumulator type having a plurality of digit indicating elements and a row of normally open switches for each element each switch representing a digit of the element and being closed when its respective digit is indicated by the element whereby one switch of each element is closed depending on the position of the counter, a rotatable record holder having voice recordings of the nine digits and zero arranged in spaced positions, a motor for rotating said record holder, pickup heads one adjacent each recording for reproducing said voice recordings, means actuated by a predetermined signal for energizing said motor to rotate said record holder, scanning means connected to be actuated by said motor for connecting the closed switch of each of said elements in order and at predetermined substantially equal intervals to their respective heads representing the respective digit corresponding to each closed switch, a normal electric current supply for energizing said motor, an electric actuating means for said counter, an electric circuit for connecting said actuating means to the output of a measuring device or the like for controlling said actuating means, an electric battery, and switching means in said circuit for connecting said counter to be normally energized by said normal electric current supply and for connecting said electric circuit to said battery to energize said counter and maintain it energized upon failure of said normal electric current supply, and means for transmitting the voice signals from the selected digit recording to a telephone circuit.

3. A transmitting apparatus for telemetering systems and the like comprising a counter of the digital accumulator type having a plurality of digit indicating elements and a row of normally open switches for each element each switch representing a digit of the element and being closed when its respective digit is indicated by the element whereby one switch of each element is closed depending on the position of the counter, a rotatable record holder having voice recordings of the nine digits and zero arranged in spaced positions, a motor for rotating said record holder, pickup heads one adjacent each recording for reproducing said voice recordings, means actuated by a predetermined signal for energizing said motor to rotate said record holder, scanning means connected to be actuated by said motor for connecting the closed switch of each of said elements in order and at predetermined substantially equal intervals to their respective heads representing the respective digit corresponding to each closed switch, an additional normally open switch positioned to be actuated by said scanning means at the same interval after the scanning of the last of said elements for connecting the zero record pickup head to transmit "zero" as a last digit following the digit indicated by the counter, and means for transmitting the voice signals from the selected digit recording to a telephone circuit.

4. A transmitting apparatus for telemetering systems as set forth in claim 3 including emergency switching means for interrupting the circuit of said zero record pickup and for connecting another of said pickup heads to said additional switch, and alarm means for actuating said emergency means.

References Cited

UNITED STATES PATENTS

| | | | |
|---|---|---|---|
| 1,277,440 | 9/1918 | Lundell | 179—6 |
| 1,337,197 | 4/1920 | Clausen | 179—6 |
| 1,678,103 | 7/1928 | Coverly | 179—27.21 |
| 3,081,431 | 3/1963 | Werner | 324—99 |

OTHER REFERENCES

Keane, C. C.: "What's New in Pipeline Electronics," Feb. 7, 1955, pages 92–95, The Oil and Gas Journal.

TERRELL W. FEARS, *Primary Examiner.*

L. M. ANDUS, WALTER L. CARLSON, *Examiners.*

W. C. COOPER, J. P. SCHERLACHER, R. V. ROLLINEC, A. I. NEUSTADT, *Assistant Examiners.*